United States Patent [19]

Wischermann

[11] Patent Number: 5,191,419
[45] Date of Patent: Mar. 2, 1993

[54] VIDEO NOISE REDUCER WITH DETECTION OF BOTH TOTAL AND TEMPORAL PICTURE CHANGES

[75] Inventor: Gerhard Wischermann, Weiterstadt, Fed. Rep. of Germany

[73] Assignee: BTS Broadcast Television Systems GmbH, Darmstadt, Fed. Rep. of Germany

[21] Appl. No.: 690,620

[22] Filed: Apr. 24, 1991

[30] Foreign Application Priority Data

Apr. 27, 1990 [DE] Fed. Rep. of Germany ....... 4013474

[51] Int. Cl.$^5$ ........................................... H04N 5/213
[52] U.S. Cl. .................................... 358/167; 358/105
[58] Field of Search .................. 358/167, 36, 105, 166

[56] References Cited

U.S. PATENT DOCUMENTS

| | | | |
|---|---|---|---|
| 4,242,704 | 12/1980 | Ito et al. | 358/36 |
| 4,242,705 | 12/1980 | Ebihara | 358/167 |
| 4,485,403 | 11/1984 | Illetschko | 358/167 |
| 4,539,594 | 9/1985 | Illetschko | 358/166 |
| 4,661,853 | 4/1987 | Roeder et al. | 358/167 |
| 4,679,086 | 7/1987 | May | 358/167 |
| 4,703,358 | 10/1987 | Flannaghan | 358/167 |
| 4,882,627 | 11/1989 | Keesen et al. | 358/167 |
| 4,947,251 | 8/1990 | Hentschel | 358/11 |
| 5,055,920 | 10/1991 | Illetschko et al. | 358/105 |

OTHER PUBLICATIONS

"The Art of Digital Video", J. Watkinson (Focal Press, London and Boston, 1990), p. 211.

Primary Examiner—James J. Groody
Assistant Examiner—Jeffrey S. Murrell
Attorney, Agent, or Firm—Frishauf, Holtz, Goodman & Woodward

[57] ABSTRACT

A video noise reducer comprises a full picture memory and provides comparison of corresponding pixels of undelayed and delayed video signals, in which the delayed signal is fed back and mixed which is the undelayed signal at a controllable fader fading factor controlled by the absolute value difference between compared pixels subjected to filtering and other processing. In this noise reducer pixel comparison is elaborated to provide a signal designating the sign of the difference and a temporal (non-spatial) motion detector checks for the predominance of designations of one sign (and the rarity of designations of the other sign) in order to establish the presence of a fading procedure which must not be mistakenly interpreted as a detection of motion in the picture content. The temporal motion detector can be constituted so that isolated designations of a sign opposite to the preponderant sign of a succession of designations of the same sign cannot prevent the recognition of the presence of a fading procedure.

14 Claims, 4 Drawing Sheets

VIDEO NOISE REDUCER WITH DETECTION OF BOTH TOTAL AND TEMPORAL PICTURE CHANGES

This invention concerns modification of the fading factor used for mixing an undelayed video signal with the same video signal delayed by one full picture period, for purposes of noise reduction in which the fading factor modification is usually controlled by a detector of motion in the picture content of the video signal.

In known circuit apparatus for noise reduction a video signal is delayed by a full picture period. The delayed video signal and the currently supplied video signal are then put through a controllable fader at the input of the picture memory used for the delay. The fader consists of two multipliers to respectively multiply the delayed video signal by a factor k and the currently supplied video signal by a factor $(1-k)$. Each fading factor lies between $k=0$ and $k=1$.

For quiescent picture contents the fading factor k can advantageously be relatively large in the interest of providing a high degree of noise reduction. Such a fading factor, however, produces motion-drag for moving picture contents and, accordingly, in the known noise reduction systems—hereafter referred to as noise reducers—the fading factor k is reduced as motion in the picture increases. For this purpose a motion detector is necessary from which the amount of difference between the output signal of the delay memory and the currently supplied video signal can be generated pixel by pixel.

Such noise reducers have been widely installed in video studios, but have the disadvantage in that the reduction effect is impaired cases of changes of picture content that are not caused by movement in the picture, but rather by small amplitude changes If such amplitude changes result from fading in and fading out picture content they have heretofore been treated as movement in the picture by motion detectors in the noise reducers available in the past. In consequence, such equipment, since fading factor k for noise reduction is reduced during fading in or out of a picture, the noise appears unreduced during the fading procedure.

SUMMARY OF THE INVENTION

It is an object of the present invention to overcome the above-described disadvantage and to obtain the best possible noise reduction during fading in and fading out of picture content.

Briefly, for the current and delayed pixels compared pair by pair an additional output is provided indicating simply the sign of the difference in each case. Then, when differences of one sign are predominant among the sign indications which are produced, the noise reduction fading factor applied to the fader to which the delayed and undelayed video signals are supplied is at least partially prevented from being reduced by a motion detector.

There are various ways that are useful for detecting the above-mentioned predominance. For example, when an indicated difference sign follows an indicated difference of the same sign, a numerical register can be advanced; and when an indicated difference sign follows an indicated difference of the opposite sign, the register can be decremented, not necessarily by the same amount as the amount of advance just mentioned, preferably by a somewhat larger amount. The numerical content of the register may then be utilized for modifying the degree of dependence of the fading factor on the output of the motion detector.

Instead of the simple numerical register, a temporal (non-spatial) motion detector (TMD) can be used having an initial state 0 and being capable of taking on other states in such a way that an unbroken succession of sign indications of the same sign produces a state more remote from the initial state, for example by small steps as the succession lengthens, whereas the occurrence of a sign indication which follows an indication of an opposite sign produces a state of the system much closer to the initial state. The output of the TMD which indicates how far the current state is from the initial state, is then used to control the fading factor. The invention has the advantage that amplitude changes which are not caused by motion in the picture content no longer are mistaken for indications of motion, so that noise reduction is improved during fading in and fading out of a picture. The TMD is of a class of devices sometimes referred to as state machines.

BRIEF DESCRIPTION OF THE DRAWINGS

The invention is further explained by way of illustrative example, especially in regard to the means by which the above functions are performed, with reference to the annexed drawings, in which.

The same parts are designated by the same reference symbols of the several figures of the drawings. Letters are used for designating the various equipment parts in order to distinguish them from the numerical data necessary for the state diagrams of FIGS. 6 and 7.

DESCRIPTION OF THE ILLUSTRATED EMBODIMENTS

Figure 1:
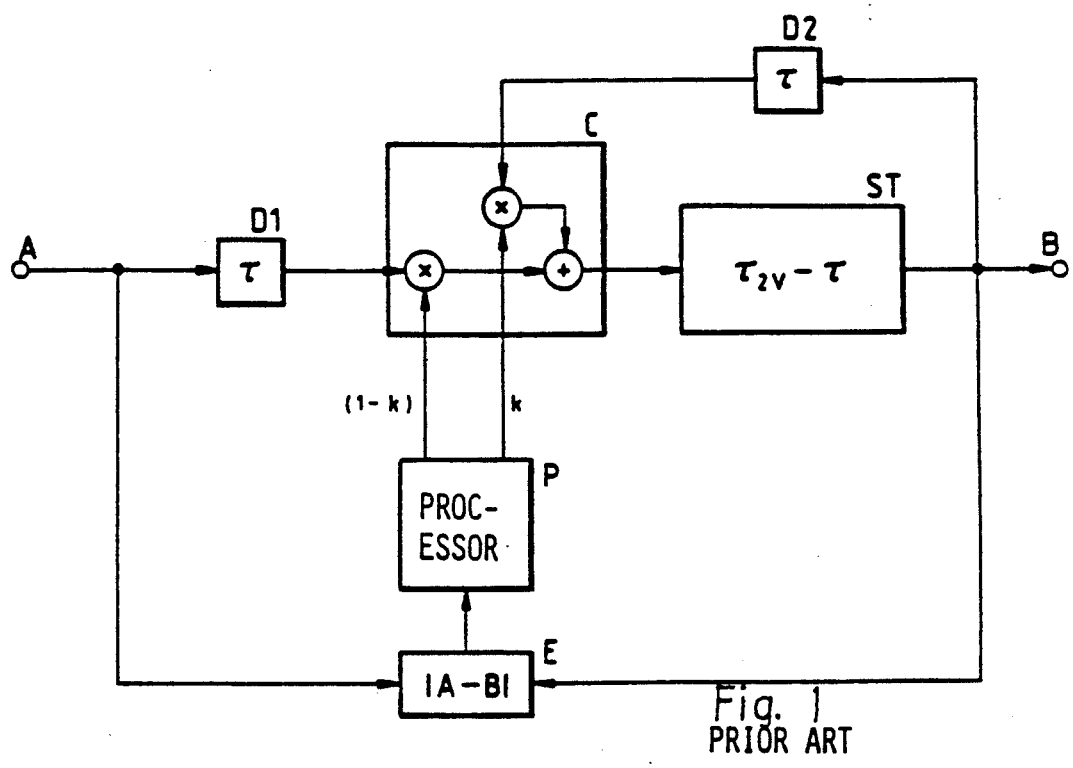
FIG. 1 is a block circuit diagram of a known noise reducer.

In the known noise reducer shown in FIG. 1, a digital video signal A is supplied to one input. It proceeds therefrom through a delay device D1 to a first input of the fader C which consists essentially of two multipliers, of which one multiplies a video signal A with a factor $(1-k)$ and the other multiplies a video signal B with a factor k. The output signal of the fader C is supplied to a picture memory ST out of which, after a full picture period, less the delay time interval of a second delay device D2, the delayed video signal B is read out. From the output of the second delay device D2 the video signal B is supplied to another input of the fader C. The delayed video signal B, furthermore, represents the noise-reduced output signal of the system of FIG. 1.

Figure 2:
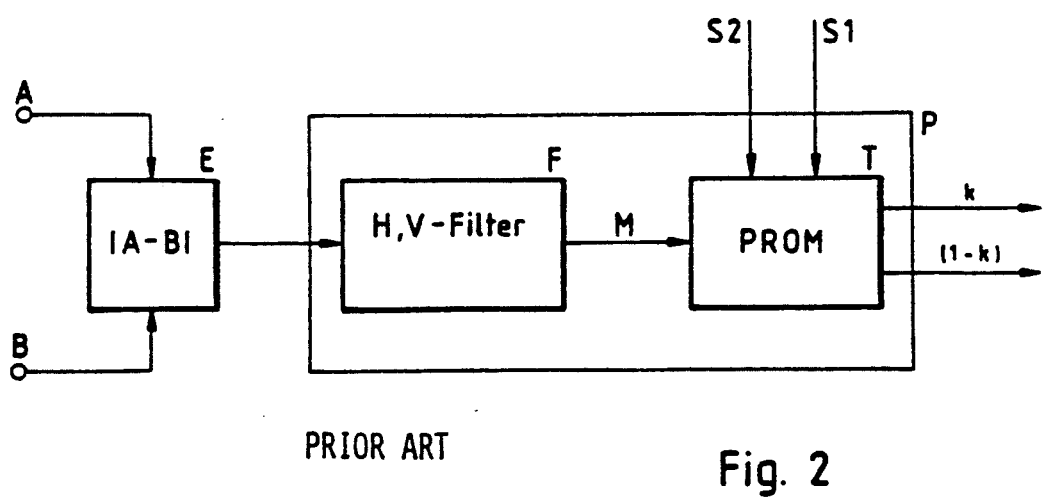
FIG. 2 is a block circuit diagram of a circuit for deriving the fading factor in the known noise reducer of FIG. 1.

In a known way, the fading factor k is obtained in accordance with whether movement has been found to be present in the picture content. For that purpose, in a circuit E the absolute value |A−B| from the video signals A and B. From the absolute difference value the factors k and (1−k) are derived in a processor P. These factors are supplied to the fader C. The delay devices D1 and D2 serve for matching the propagation time of the video signals to the propagation time in the circuits E (FIG. 1) and F (FIG. 2).

For further explanation of the derivation of the factors reference will now be made to FIG. 2 in which, along with the circuit E for producing the difference value, the processor P is shown in somewhat more detail. The value of the difference |A−B| is first subject to low pass filtering in a known way in a filter F which is effective in the horizontal and in the vertical direction, in order to eliminate high-frequency noise components in the difference signal. Such filters are illustrated in "The Art of Digital Video" by John Watkinson (Focal Press, London and Boston, 1990) at pages 210 and 211.

Figure 3:
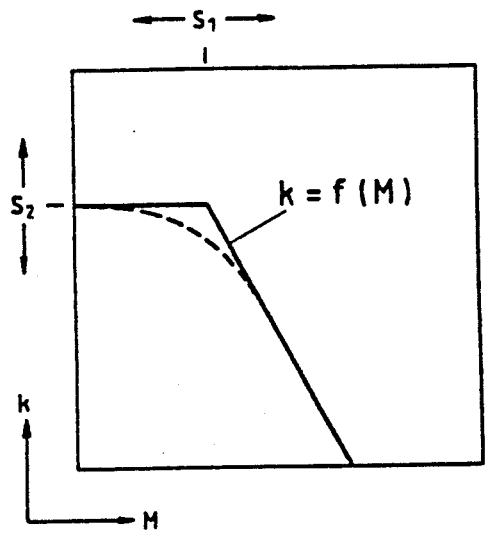
FIG. 3 is a diagram of the dependence of the fading factor k on a motion signal.

If the output signal M of the filter F, which is referred to further herein as the motion signal, is supplied to the address inputs of a read-only memory T. A table which is deposited on that memory represents the values of the factors k and (1−k) for the various possible values of the motion signal M. In addition two signals S1 and S2 are supplied to the address inputs of the read-only memory T which, as shown in FIG. 3, represent parameters of the characteristic curve shown in that figure. By changing the signal S1 the threshold of the motion signal can be set on one side of which there is reduction of the signal M by the factor k.

The optimal setting of this threshold value depends upon the magnitude of the noise in the incoming video signal A. When the input signal is only slightly impaired by noise a setting will generally be satisfactory in which the noise reduction is already reduced in effect when there is rather small movement in the picture. If, however, the input signal is greatly impaired by noise, then even at large values of the motion signal M, a maximum noise reduction is selected at the price of some movement drag in the picture.

Figure 5:
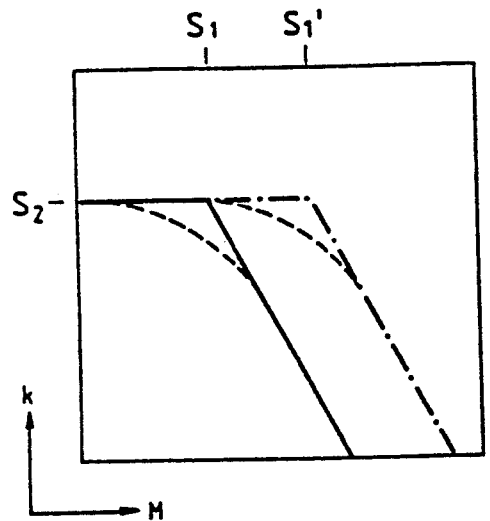
FIG. 5 is a diagram of the course of the fading factor in the equipment of FIG. 4.

The signal S2 serves to preset the degree of noise reduction for still picture contents. In the presence of large motion signals the factor k is reduced to zero. In FIGS. 3 and 5 there are shown by broken lines a gradual transition that is generally used, instead of the illustrated solid-line characteristic with a sharp corner, in practical noise reducer embodiments.

In the known noise reducers the motion signal M is large, so that the factor k is strongly reduced even in fading procedures in which the amplitude of the input signal is changed in the same direction for large partial regions of the picture. That effect is avoided in the circuit apparatus illustrated in FIG. 4 for deriving the factors k and (1−k) in accordance with the invention. In this case, instead of the circuit E in FIG. 2 a circuit E' is provided which, in addition to calculating the absolute value |A−B|, also provides an output designating the sign of that difference and supplies the corresponding signal S± to a temporal motion detector TD. The read-only memory T' has three more address places than the read-only memory T of FIG. 2 has. To these three additional addresses a three-bit wide signal S3 is supplied from the temporal motion detector TD to signify whether or how plainly a fading procedure is being recognized. If the signals S1 and S3 are added, which is performed by a corresponding programming of the read-only memory T', the threshold value is made gradually larger until it reaches a value S1' at a maximum value of the input S3. Then, out of the table stored in T', values of k and (1−k) coming to the chain-dotted characteristic line shown in FIG. 5 are read out. When a fading procedure is present, therefore, in spite of how great values of the motion signal M may be, the factor k is not so strongly reduced.

The derivation of the signal S3 from the sign indication signal S± by means of the temporal motion detector TD, which in the simplest case can be a numerical register for the number of uninterrupted successive designations of the same sign, is now described with reference to the state diagram shown in FIG. 6, and representing a logic circuit constituting a temporal motion detector TD' for the circuit of FIG. 4. As is usual in state diagrams, the various states are designated by circles and the transitions between the states by arrows. In the transitions shown designation of the numeral 1 signifies that the sign of the sign signal S± is positive, whereas a zero is an indication of a negative sign. The signal S± is actually two bits wide so that in addition to indication of a positive or a negative difference between the pixels compared there can also be shown the case of a zero difference. The zero difference case produces no change of state in the temporal motion detector. Its possible occurrence is therefore neglected in the following explanation of the operation of the temporal motion detector.

Figure 6:
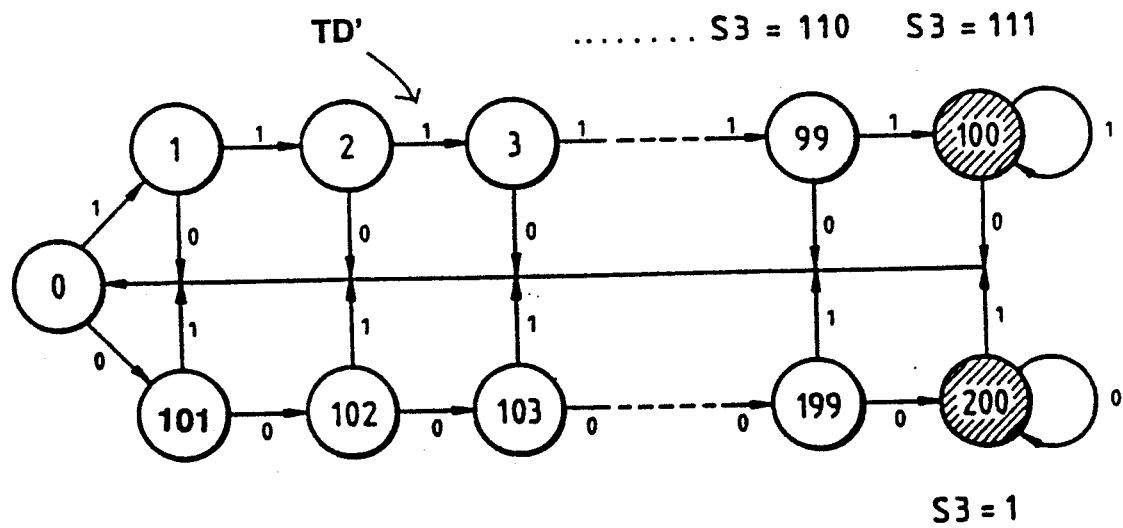
FIG. 6 is a state diagram of a TMD for use in the circuit of FIG. 3.

In the initial state 0 (shown at the left of FIG. 6) the arrival of a sign designation signal S± changes the state of the temporal motion detector TD' represented in FIG. 6 to one of the states 1 or 101 according to which sign is designated. If the comparison of the next pixel pair produces the same sign designation, then a further change to the state 2 or to the state 102 takes place. If the sign designation changes, however, the temporal motion detector goes back into the initial state 0. Only when 100 compared pixel pairs have successively produced the same sign designations can one of the states 100 or 200 be reached. That has the consequence that the signal S3 will take on the value 1, an event that leads to the chain-dotted characteristic line in FIG. 5. If still more designations of the same sign follow, the temporal motion detector remains in the state 100 or 200. If a change of sign occurs, the temporal motion detector goes back into its initial state 0 and the signal S3 takes on the value 0.

A temporal motion detector having the state diagram illustrated in FIG. 6 is subject to much interference of a strong noise component in the video signal, however. In other words, in spite of the fact that a fading procedure is underway, if the sign designation in an isolated instance jumps to the opposite sign for one pixel pair and does so in enough isolated instances, the state 100 or the state 200 cannot be reached. For this reason, the circuit implementation of logic circuits defined by state diagrams is here deferred until FIG. 7 is similarly described.

Figure 7:
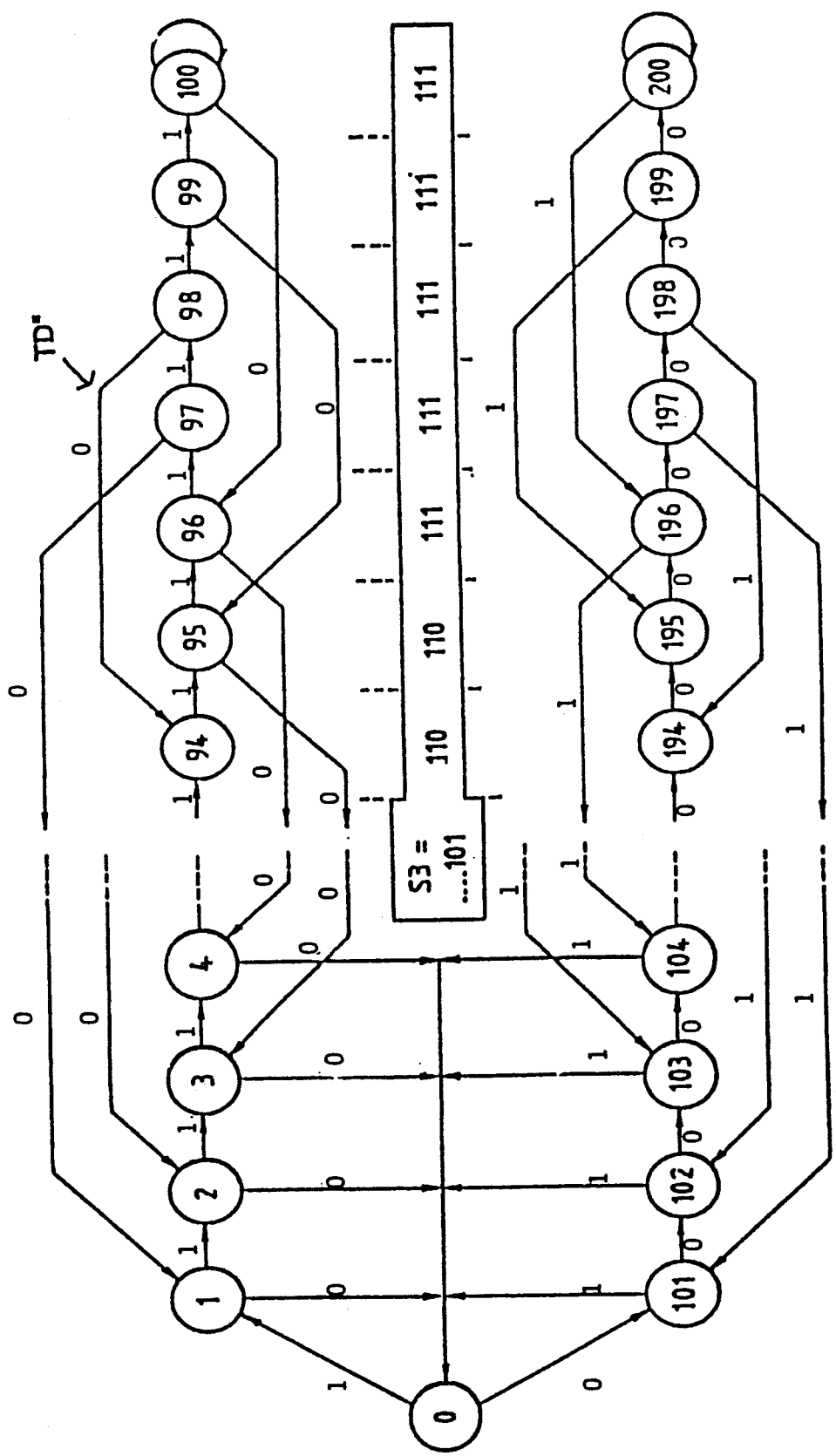
FIG. 7 is a state diagram for a modification of the TMD shown in FIG. 6.

Substantially more safety against noise disturbance is provided by the temporal motion detector TD" having the state diagram shown in FIG. 7 in which, in addition to the states of the temporal motion detector, various values of S3 are provided as dual numbers that are three bits wide. In this case, after a change of sign takes place following a succession of pixel comparisons giving the same sign designation, the state of the temporal motion detector is set back by only four steps. In consequence reaching the state 100 or the state 200 is not prevented by isolated changes of sign in a long sequence of indications of the same sign. In the state 96 or 196 the signal S3 reaches its maximum value 111. If the temporal motion detector then goes into the state 100 or 200, no unintended reduction of S3 takes place in spite of an isolated change of sign that may still occur. Only after several changes of sign does S3 decline gradually in value. According to the requirements of the particular case, the temporal motion detector can be varied in detail within the scope of the invention, as shown for example in FIG. 7. A setback of more or less than four steps can be provided there in the case of a change of sign. In principle it is also possible to provide an embodiment of the invention in which the signal S3 is only one bit wide, in which case it switches only between two characteristic lines for the modification of the motion signal.

The temporal motion detector TD" of FIG. 7 can be incorporated into a GAL or PAL (programmable array logic) unit of type p22v10 according to the programming set forth in the following tabulation, expressed in the usual programming language for such devices.

```
title 'temporal motion detector'
tmdl       device              'p22v10';
ck                             pin  1;
s                              pin  2;
s3                             pin 23;
q7                             pin 22;
q6                             pin 21;
q5                             pin 20;
q4                             pin 19;
q3                             pin 18;
q2                             pin 17;
q1                             pin 16;
q0                             pin 15;
q = [q7,q6,q5,q4,q3,q2,q1,q0];
state_diagram q
  state  0: if s then  1 else 0;
  state  1: if s then  2 else 0;
  state  2: if s then  3 else 0;
       .
       .
       .
  state 99: if s then 100 else 0;
  state 100: if s then 100 else 0;
  state 101: if !s then 102 else 0;
  state 102: if !s then 103 else 0;
  state 103: if !s then 104 else 0;
       .
       .
       .
  state 199: if !s then 200 else 0;
  state 200: if !s then 200 else 0;
equations
  x := (q == 100) # (q == 200);
end detector
```

Figure 4:
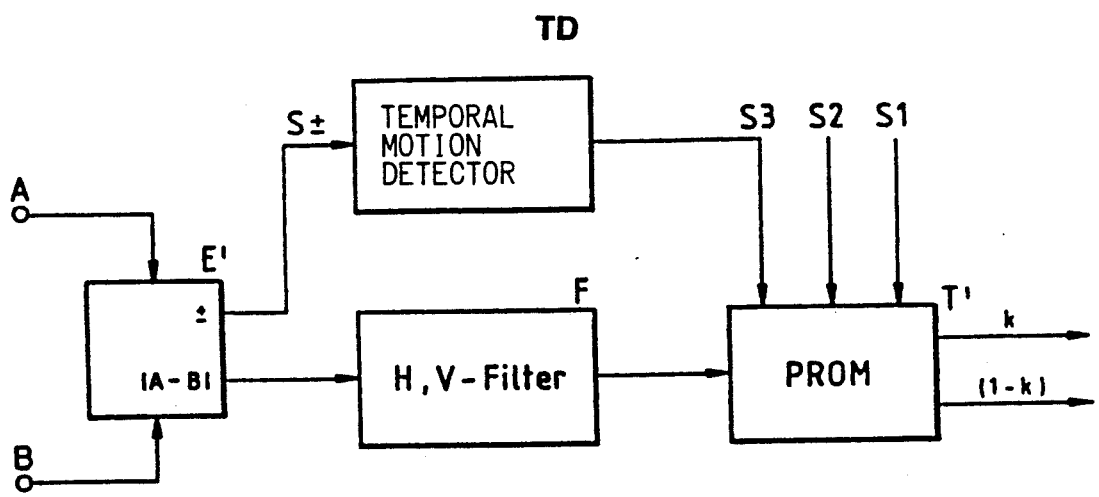
FIG. 4 is a block circuit diagram of equipment for deriving the fading factor signal in a noise reducer in accordance with the invention.

As shown in FIG. 4, the sign indication signals for successive neighboring locations are supplied one after the other to the temporal motion detector TD, for which there may be substituted, for example, an embodiment TD' according to FIG. 6 or an embodiment TD" according to FIG. 7. Evaluation thus takes place within a line or a section of a line. It is also possible within the scope of the invention to bring into the evaluation pixels which are distributed over the entire picture. In such a case it is practical to select some pairs for comparison which are irregularly distributed, so that a movement of periodic structures does not get recognized as a fading procedure. For evaluation of pixel pairs that are distributed over the entire picture, the temporal motion detector can be supplied with low frequency clock pulses obtained by frequency division.

It will therefore be seen that although the invention has been illustrated with reference to particular illustrative embodiments, variations and modifications are possible within the inventive concept.

I claim:

1. Apparatus including a fader circuit (C) for reducing noise in a first video signal (A) provided to a first input of said fader circuit (C), said fader circuit having an output, said apparatus having a write-read memory (ST) connected in circuit for delaying a second video signal for essentially a full picture period to produce in a read-out of said write-read memory a delayed second video signal (B) said output of said fader circuit (C) providing said second video signal and being connected to an input of said write-read memory and having said first input and a second input connected for fading together said first video signal (A) and said delayed second video signal (B) at a controllable fading factor (k), a total motion detector (E', P) including a comparator (E') connected for comparing corresponding pixels of said delayed second video signal (B) and said first video signal (A) and a control circuit (P), having a preliminary filter (F) for eliminating high frequency noise components, of which an input is connected to an output of said comparator (E'), wherein said filter output produces a signal (M) representative of the absolute value difference between said corresponding pixels, said control circuit also including a read-only memory (T') for modifying said fading factor in response to said filter output signal (M) so that, with increasing total motion in a scene defined by said first video signal, the contribution of said delayed second video signal to the output of said fader circuit is reduced, characterized in that said comparator (E') has a second output (±) for a signal designating the sign of every said difference between corresponding pixels found in comparison of said first video signal and said delayed second video signal by said comparator, in addition to said output of said comparator connected to said control circuit (P);

said read-only memory (T') of said total motion detector is connected for being addressed jointly by output (M) from said preliminary filter (F) and by at least first and second address signal values, said first address signal value (S1) being a motion-signal-effectiveness threshold value, and a temporal motion detecting logic circuit (TD, TD' TD") having an input connected to said output (±) for said sign designating signal of said comparator and an output connected to supply said second address signal value (S3) to an address input of said read-only memory, for at least partially preventing the reduction of the fading factor applied in said fader circuit (C) when designations of the same sign are predominant among sequential sign designations provided by said sign designating signal.

2. The apparatus of claim 1, wherein said temporal motion detecting logic circuit (TD) includes a numerical storage register, connected in circuit for having its numerical content altered in a first direction by a first determined amount when one of said sign designations provided by said sign designating signal follows another of said sign designations which is of the same sign and for having its numerical content altered in a second direction opposite to said first direction by a second predetermined amount when one of said sign designations provided by said sign designating signal follows another of said sign designations which is of the opposite sign, said storage register having an output (S3), connected to said address input of said read-only memory (T') for said second address signal value, for modifying the degree of dependence of said fading factor on detected total motion in accordance with the current numerical content of said register.

3. The apparatus of claim 1, wherein said temporal motion detecting logic circuit has an initial state (0) and is capable of taking on other states (91-100; 101-200) in response to said sequential sign designations provided by said sign designating signal for producing a state of said logic circuit more remote from said initial state when said sign designations an indication are all of the same sign and for producing a state of said logic circuit closer to said initial state when one of said sign designations follows another of said sign designations which is of an opposite sign, said temporal motion detecting logical circuit output being dependent on how far from said initial state is the current state of said temporal motion detecting logic circuit.

4. The apparatus of claim 3, wherein said temporal motion detecting logic circuit is connected for producing a one-step change of state of the logic circuit away from said initial state in response to one of said sign designations that follows another of said sign designations which is of the same sign and for producing a multiple step change of state towards said initial state in response to one of said sign designations which follows another of said sign designations which is of the opposite sign.

5. The apparatus of claim 4, wherein said multiple step change is a four-step change.

6. The apparatus of claim 3, wherein said temporal motion detecting logic circuit is connected for producing a one-step change of state away from said initial state in response to one of said sign designations that follows another of said sign designations which is of the same sign and for producing a transfer to the initial state (0) in response to one of said sign designations which follows another of said sign designation which is of the opposite sign.

7. The apparatus of claim 3, wherein said read-only memory (T') is connected for being addressed as aforesaid, jointly with a contribution of a third signal value (S2), supplied at a third additional input of said read-only memory for representation of the degree of noise reduction for still picture content and wherein said read-only memory (T') contains a stored table and also has at least one fading factor data output for data from said table which are a function of an output of the total motion detector (P) for different values of the output of said temporal motion detecting logic circuit (TD, TD', TD") and also a function of different values of said first (S1) and third (S2) signal values, which are predetermined setting values, supplied respectively to said first and third additional inputs of said read-only memory (T').

8. The apparatus of claim 1, wherein said control circuit (P) for modifying said fading factor in response to said total motion detector is deigned to produce a fading factor which is substantially independent of said total motion detector up to a threshold value of detected total motion set by said first signal value (S1) and, beyond said threshold value, is reduced with increasing detection of total motion, and wherein said temporal motion detecting logic circuit (TD, TD', TD") produces an output (S3) supplied to said read-only memory (T') at said second additional input thereof which has the effect, by virtue of contents of said read-only memory, of raising said threshold value when sign designations of one sign are predominant among said sign designations of said sign designating signal (S±).

9. The apparatus of claim 1, wherein said read-only memory (T') is connected for being addressed as aforesaid, jointly with a contribution of a third signal value (S2), supplied at a third additional input of said read-only memory for representation of the degree of noise reduction for still picture content and wherein said read-only (T') contains a stored table and also has at least one fading factor data output for data from said table which are a function of an output of the total motion detector (P) for different values of the output of said temporal motion detection logic circuit (TD, TD', TD") and further for different values of said first (S1) and third (S2) signal values, which are predetermined setting values, supplied respectively to said first and third additional inputs of said read-only memory (T').

10. The apparatus of claim 9, wherein said temporal motion detecting logic circuit (TD) includes a numerical storage register, connected in circuit for having its numerical content altered in a first direction by a first determined amount when one of said sign designations provided by said sign designating signal follows another of said sign designations which is of the same sign and for having its numerical content altered in a second direction opposite to said first direction by a second predetermined amount when one of said sign designations provided by said sign designating signal follows another of said sign designations which is of the opposite sign, said storage register having an output (S3), connected to said input of said control circuit for said second additional signal value, for modifying the degree of dependence of said fading factor on detected total motion in accordance with the current numerical content of said register.

11. The apparatus of claim 9, wherein said temporal motion detecting logic circuit (TD') is connected for producing a one-step change of logic circuit state away from said initial state in response to one of said sign designations that follows another of said sign designations which is of the same sign and for producing a multiple step change of state towards said initial state in response to one of said sign designations which follows another of said sign designation which is of the opposite sign.

12. The apparatus of claim 11, wherein said multiple step change is a four-step change.

13. The apparatus of claim 9, wherein said temporal motion detecting logic circuit is connected for producing a one-step change of state away from said initial state in response to one of said sign designations that follows another of said sign designation which is of the same sign and for producing a transfer to the initial state (0) in response to one of said sign designations which follows another of said sign designation which is of the opposite sign.

14. The apparatus of claim 9, wherein said control circuit (P) for modifying said fading factor in response to said total motion detector is designed to produce a fading factor which is substantially independent of said total motion detector up to a threshold value of detected total motion set by said first signal value (S1) and, beyond said threshold value, is reduced with increasing detection of total motion, and wherein said temporal motion detecting logic circuit (TD, TD', TD") produces an output (S3) supplied to said read-only memory (T') at said second additional input thereof which has the effect, by virtue of contents of said read-only memory, of raising said threshold value when sign designations of one sign are predominant among said sign designations of said sign designating signal (S±).

* * * * *